United States Patent
Weber et al.

(10) Patent No.: US 7,925,156 B2
(45) Date of Patent: Apr. 12, 2011

(54) APPARATUS AND METHOD FOR MEASURING THE QUALITY OF BURST SIGNALS AND PERFORMING OPTICAL LINE DIAGNOSTICS

(75) Inventors: Raviv Weber, Herzliya (IL); Amiad Dvir, Nes Ziona (IL); Eli Elmoalem, Nili (IL); Alex Goldstein, Netanya (IL); Igor Elkanovich, Tel Mond (IL); David Avishai, Nes Ziona (IL)

(73) Assignee: Broadlight, Ltd., Herzliya (IL)

( * ) Notice: Subject to any disclaimer, the term of this patent is extended or adjusted under 35 U.S.C. 154(b) by 735 days.

(21) Appl. No.: 11/961,789

(22) Filed: Dec. 20, 2007

(65) Prior Publication Data

US 2008/0193125 A1    Aug. 14, 2008

Related U.S. Application Data

(60) Provisional application No. 60/880,390, filed on Jan. 16, 2007.

(51) Int. Cl.
*H04B 10/00* (2006.01)

(52) U.S. Cl. .......... 398/25; 398/27; 398/30; 398/72

(58) Field of Classification Search .......... 398/1–39, 398/66–73
See application file for complete search history.

(56) References Cited

U.S. PATENT DOCUMENTS

| | | | |
|---|---|---|---|
| 5,463,351 A * | 10/1995 | Marko et al. | 331/1 A |
| 5,761,212 A * | 6/1998 | Foland et al. | 714/719 |
| 6,178,215 B1 * | 1/2001 | Zhang et al. | 375/371 |
| 6,522,436 B2 * | 2/2003 | Roberts et al. | 398/27 |
| 6,714,741 B1 * | 3/2004 | Van De Bergh et al. | 398/34 |
| 6,801,547 B1 * | 10/2004 | Boyd et al. | 370/508 |
| 6,870,836 B1 * | 3/2005 | Dyke et al. | 370/355 |
| 6,961,520 B2 * | 11/2005 | Grau et al. | 398/33 |
| 7,031,616 B2 * | 4/2006 | Eilenberger et al. | 398/155 |
| 7,050,666 B2 | 5/2006 | Welch et al. | |
| 7,130,341 B2 | 10/2006 | Haunstein et al. | |
| 7,149,269 B2 * | 12/2006 | Cranford et al. | 375/373 |
| 7,269,397 B2 * | 9/2007 | Carballo et al. | 455/135 |
| 7,307,569 B2 * | 12/2007 | Vrazel et al. | 341/144 |
| 7,382,739 B2 * | 6/2008 | Kramer | 370/254 |
| 7,428,382 B2 * | 9/2008 | Soto et al. | 398/20 |
| 7,457,391 B2 * | 11/2008 | Gregorius et al. | 375/373 |
| 7,577,226 B2 * | 8/2009 | Sou | 375/376 |
| 7,596,175 B2 * | 9/2009 | Chen | 375/229 |
| 7,697,649 B2 * | 4/2010 | Okamura | 375/355 |
| 7,729,612 B2 * | 6/2010 | Jiang et al. | 398/10 |
| 7,782,934 B2 * | 8/2010 | Choi | 375/231 |
| 7,817,767 B2 * | 10/2010 | Tell et al. | 375/376 |
| 2001/0021987 A1 * | 9/2001 | Govindarajan et al. | 714/705 |

(Continued)

*Primary Examiner* — Agustin Bello
(74) *Attorney, Agent, or Firm* — Myers Wolin, LLC (57) ABSTRACT

Apparatus and method to measure the quality of burst signals and to perform optical line diagnostics in and optical passive optical network (PON). Statistical information about phase noise (jitter), signal distortion, clock distortions, and any other effects present in burst signals is generated. The statistics are based on phase and bit-length distortions, direction and length of the effect as detected by a phase error detector integrated in a burst mode clock and data recovery (BCDR) circuit. The invention can be further adapted to perform optical line diagnostics to detect the root cause performance degradation and failures in the PON, thereby providing an optical layer supervision tool for monitoring the PON. The statistical information can be used to estimate the quality of service (QoS) per customer connected to the PON. In addition, the generated statistic information can be used to calibrate transmission parameters of optical network unit (ONU) transmitters.

9 Claims, 5 Drawing Sheets

U.S. PATENT DOCUMENTS

| | | | |
|---|---|---|---|
| 2002/0015200 A1* | 2/2002 | Jennings et al. | 359/124 |
| 2002/0141009 A1* | 10/2002 | Yu et al. | 359/110 |
| 2002/0167693 A1* | 11/2002 | Vrazel et al. | 359/109 |
| 2003/0123594 A1* | 7/2003 | Glenn et al. | 375/373 |
| 2004/0001567 A1* | 1/2004 | Wei | 375/371 |
| 2004/0062332 A1* | 4/2004 | Dabral et al. | 375/373 |
| 2004/0066867 A1 | 4/2004 | Fujimori et al. | |
| 2004/0212416 A1* | 10/2004 | Buchwald et al. | 327/248 |
| 2004/0264615 A1* | 12/2004 | Ho et al. | 375/355 |
| 2005/0238093 A1* | 10/2005 | Payne et al. | 375/224 |
| 2005/0259774 A1* | 11/2005 | Garlepp | 375/355 |
| 2006/0171714 A1* | 8/2006 | Dove | 398/71 |
| 2006/0223478 A1 | 10/2006 | Carballo et al. | |
| 2006/0228113 A1* | 10/2006 | Cutillo et al. | 398/71 |
| 2007/0064850 A1* | 3/2007 | Tamura | 375/355 |
| 2007/0122159 A1* | 5/2007 | Dalton | 398/155 |
| 2007/0140689 A1* | 6/2007 | Haran | 398/27 |
| 2008/0022143 A1* | 1/2008 | Scouten et al. | 713/400 |
| 2008/0124092 A1* | 5/2008 | Dvir et al. | 398/155 |
| 2008/0193125 A1* | 8/2008 | Weber et al. | 398/25 |
| 2008/0199191 A1* | 8/2008 | Essiambre et al. | 398/208 |
| 2009/0016714 A1* | 1/2009 | Soto et al. | 398/20 |

* cited by examiner

Eye Pattern　　　　　　　　　　　　　PRB - Input　320

Ideal Input Signal

Random Jitter

Crossing Distortion

Duty Cycle distortions

Narrow Bit case

APPARATUS AND METHOD FOR MEASURING THE QUALITY OF BURST SIGNALS AND PERFORMING OPTICAL LINE DIAGNOSTICS

CROSS REFERENCE TO RELATED APPLICATIONS

This application claims priority from U.S. provisional application No. 60/880,390 filed on Jan. 16, 2007.

PRIOR ART

Prior art references considered to be relevant as a background to the invention are listed below and their contents are incorporated herein by reference. Acknowledgement of the references herein is not to be inferred as meaning that these are in any way relevant to the patentability of the invention disclosed herein.

| | | |
|---|---|---|
| US 20040066867 | April 2004 | Fujimori; et al. |
| US 20060223478 | October 2006 | Carballo; et al. |
| U.S. Pat. No. 6,961,520 | November 2005 | Grau, et al. |
| U.S. Pat. No. 7,050,666 | May 2006 | Welch, et al. |
| U.S. Pat. No. 7,130,341 | October 2006 | Haunstein, et al. |
| USSN 11/604,748 | Filed November 2007 | Amiad, et al. |

FIELD OF THE INVENTION

The present invention relates generally to an apparatus and a method for measurement of the quality of burst signals transmitted in optical transmission systems.

BACKGROUND OF THE INVENTION

Many communication networks that provide high bit-rate transport over a shared medium are characterized by non-continuous, or burst mode, data transmission. An example of such a network is a passive optical network (PON) 100 schematically shown in FIG. 1. A typical PON 100 includes a plurality of optical network units (ONUs) 120-1 through 120-M coupled to an optical line terminal (OLT) 130 via a passive optical splitter 140. Since all ONUs function in like manner, they will be collectively referred to by the reference numeral 120 in the following description unless reference is made to a specific ONU. Traffic data transmission is performed over two optical wavelengths, one for the downstream direction and another for the upstream direction. Thus, downstream transmission from the OLT 130 is broadcast to all the ONUs 120. Each ONU 120 filters its respective data according to, for example, pre-assigned labels. Transmission from an ONU 120 to the OLT 130 is in the form of a burst, hereinafter referred to as a "cell".

Figure 1:
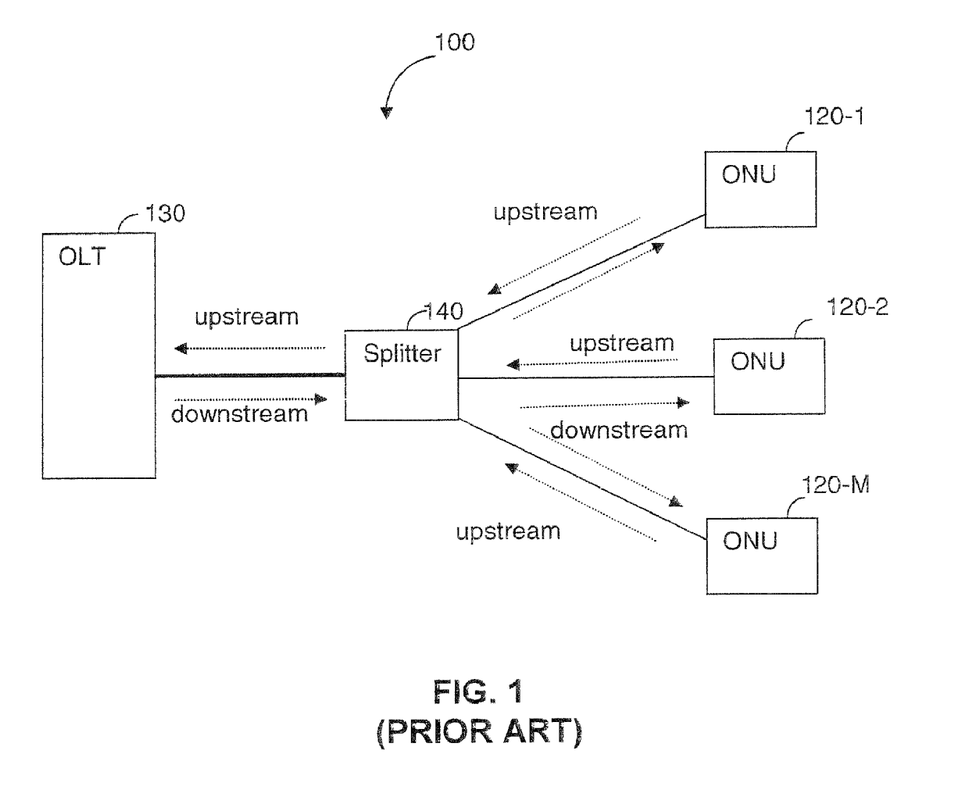
FIG. 1 is a schematic diagram of a prior art passive optical network.

The OLT 130 continuously transmits downstream data to the ONUs 120 and receives upstream burst data sent to OLT 130 from ONUs 120. The OLT 130 broadcasts data to the ONUs 120 along a common channel so that all the ONUs 120 receive the same data. An ONU 120 transmits data to the OLT 130 during different time slots allocated by the OLT 130. That is, the OLT 130 is aware of the exact arrival time of data and the identity of a transmitting ONU 120.

A PON is typically designed with varied lengths of optical links, splits, and cost driven optics, and other physical consideration, and thus suffers from optical aberrations influencing the signals. Therefore, appropriate signal processing is required in order to recover the original signal from the received signal and to avoid errors during transmission.

An optical signal sent from an ONU 120 is received by a receiver in the OLT 130 and converted into an analog electrical signal. The OLT's receiver uses a clock and data recovery (CDR) circuit or a burst mode CDR (BCDR) circuit to generate a clock corresponding to the incoming data, thereby correctly retiming the digital incoming data. After recovering the data, a forward error correction mechanism may be utilized to detect and correct errors in the received data and to provide an assessment of the signal quality. However, during the recovery process, essential information, such as eye distortion, frequency movement, phase information, and other effects are discarded, and thus the quality of the input signal cannot be correctly measured. Therefore, assessment of the signal quality is necessary prior to recovering the signals. Specifically, such assessment is required to perform signal diagnostics, per ONU, in order to reduce operational costs by better analysis of link and equipment defects, prevention of communication violations by early detection of deteriorated laser signal quality, and so on.

Measurements of signal quality are typically performed by phase margin measurements, e.g., on an eye pattern diagram. The eye pattern diagram further provides an eye measures on the additive noise and distortions in the signal. Other techniques for determining the level of jitter present at the received signal include measuring phase error parameters of a phase-lock-loop (PLL) or delay-locked loop (DLL).

Prior art solutions for measuring the quality of signal received through an optical line include a dedicated circuit that installed at the front end of a CDR circuit. Examples for such techniques may be found in US2006/0223478 and in U.S. Pat. No. 6,961,520 both incorporated herein by reference for the useful understanding of the background of the invention. These solutions do not utilize the already existing capabilities of CDR circuits for measuring phase errors, as this requires implementing mixed-signal circuits that are difficult to design. In addition, prior art solutions are not adapted to measure the quality of burst signals, and are thus not feasible in PON systems.

Other prior techniques for assessing of signals quality perform power and modulated signal amplitude indication (RSSI) measurements by estimating at least the incoming optical power. However, these techniques do not analyze the pattern of the input signal.

In PON systems there is an increasing demand to perform optical line diagnostics by statistical analysis of the received signals to determine the root cause of failures and enable PON operators the ability to perform optical layer supervision. The optical layer supervision allows more efficient operation and maintenance of PON networks, for example, by not sending technicians if the PON system works properly, dispatching the correct technician if a problem is detected the PON system, or providing correct diagnostics to the technician.

It would be therefore advantageous to provide a method and system for measuring the quality of a burst signal and for performing the root cause analysis of failures in PON systems.

SUMMARY OF THE INVENTION

In accordance with one aspect of the invention there is provided an apparatus for performing optical line diagnostics of a transmission line between optical network units (ONUs) and an optical line terminal (OLT) in a passive optical network (PON), the apparatus comprising:

a phase error unit for generating initial quality indicators and quality measures respective of input burst signals received at the OLT;

a statistical accumulation block coupled to the phase error unit and capable of performing statistical analysis on the quality measures;

a memory unit for storing statistics generated by the statistical accumulation block; and a processor for processing statistics stored in the memory unit to generate a plurality of failure indications related to the optical line diagnostics.

According to another aspect of the invention there is provided a method for performing optical line diagnostics of a transmission line between optical network units (ONUs) and an OLT in a passive optical network, the method comprising:

receiving an input burst signal sent from the OLT;

recognizing patterns in the inputs signal for generating initial quality indicators;

computing, per ONU, quality measures for the initial quality indicators;

computing statistics on the measured indicators in different time within the input signal; and processing the statistics to generate at least a plurality of failures indications related to the optical line diagnostics.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

The present invention provides an apparatus and method to measure the quality of burst signals in and optical passive optical network (PON). The apparatus generates statistical information about phase noise (jitter), signal distortion, clock distortions, and any other effects present in burst signals. The statistics are based on phase and bit-length distortions, direction and length of the effect as detected by a phase error detector integrated in a burst mode clock and data recovery (BCDR) circuit. The invention can be further adapted to perform optical line diagnostics of the PON in order to detect at least the root cause of performance degradation and failures in the PON. That is, the invention is adapted to provide an optical layer supervision tool for monitoring the PON. In accordance with one embodiment the statistical information can be used to estimate the quality of service (QoS) per customer connected to the PON.

Figure 2:
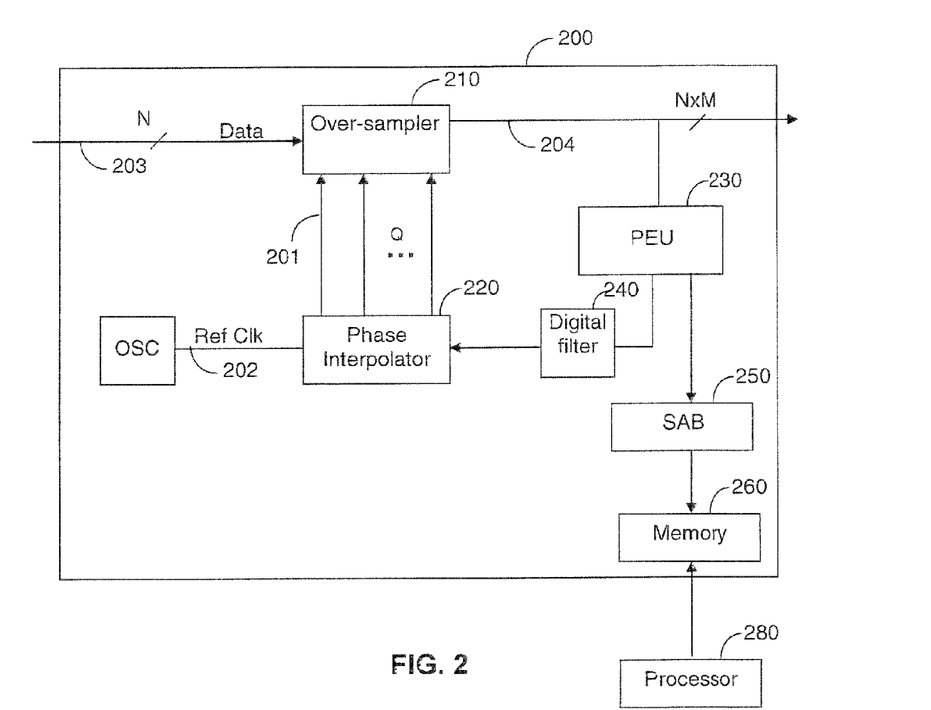
FIG. 2 is a block diagram of a BCDR circuit used to describe the operation of an embodiment of the present invention.

FIG. 2 shows a non-limiting block diagram of a BCDR circuit 200 used to describe the operation of the present invention. The BCDR circuit 200 is based on an over-sampling technique and includes an over-sampler 210, a phase interpolator 220, a phase estimation unit (PEU) 230, and a digital filter 240. The phase interpolator 220 is used to generate a number Q of sampling clock signals 201 at the oscillating frequency provided by a reference clock 202, generated by an oscillator. Each signal 201 is shifted in phase by a factor 1/Q of the clock cycle with respect to the preceding signal. The over-sampler 210 receives an input burst data signal 203 that includes N input bits. Using the sampling clock signals 201, the over-sampler 210 generates, for each input bit of data, a number M of digital samples, i.e., the output of the over-sampler 201 is the bit stream 204. The number M equals the number of samples of a unit interval of data, i.e., the over-sampler 210 performs over sampling by a factor equal to M. The PEU 230 receives the N×M bit stream 204 and extracts the phase information of the input data signal 201. That is, the PEU 230 calculates the sampling point and phase error. The phase information is input into a digital filter 240, which sets the phase interpolator 220 to generate a correct sampling clock signal (e.g., the clock signal having a sampling edge closest to the middle of the bit-interval of input data signal) for future sampling of the input data signal 201. In accordance with an embodiment of the present invention setting the phase interpolator 220 with a phase information may be achieved using a phase retrieval unit or a phase mover, as disclosed in U.S. patent application Ser. No. 11/604,748 entitled "Burst mode clock and data recovery circuit and method" assigned to common assignee and which is hereby incorporated by reference for all that it contains.

The BCDR circuit 200 further includes a statistical accumulation block (SAB) 250 which is coupled to the PEU 230 and to a memory unit 260. As will be described in greater detail below the PEU 230 together with the SAB 250 perform statistical analysis on the input signal 201 using the over-sampled bit stream 204. That is, the quality of the input signal 201 is determined prior to recovering the data. The PEU 230 recognizes patterns in the bit stream 204 that provide an indication about distortions present in the input signal 201 and produces initial quality indicators and quality measures. The initial quality indicators include at least a sampling point, a narrow bit indication, a number of consecutive of high logic values in the input bit stream, and a valid bit indication. The quality measures include, but are not limited to, an average sampling point (ASP), a number of detected narrow bits (NB), an average wave form (AWF), a jitter indication, and a duty-cycle distortion indication (DCD). The operation of the PEU 230 is described in greater detail below.

The SAB 250 aggregates these quality measures per ONU and performs statistical analysis of the quality measures at different times within a cell (e.g., beginning, middle, and an entire cell, and end of cell). Each cell is associated with an ONU-ID. Specifically, for each quality measure, the SAB 250 computes the average, absolute, minimum, swing, and maximum values at the beginning of the cell, the middle of the cell and for the entire cell. Typically, in a PON, data sent from an ONU to an OLT is encapsulated in cells, where each time a byte of the cell is transmitted to the OLT. The statistics generated for a predefined number of cells, per ONE, are saved in the memory 260. The amount of data to be saved for each ONU is a configurable parameter.

In accordance with embodiments of the present invention a processor 280, typically a processor of the OLT, is adapted to execute instructions for analyzing the data saved in the memory 260 and optionally other PON parameters for the purpose of performing optical line diagnostics for detecting at least the root cause of PON performance degradation and failures. The PON parameters comprise at least one of an optical power indication measured at the OLT and ONUs; a modulated signal amplitude indication (RSSI) measured at the OLT and ONUs; transmitter parameters of the OLT, such as a bias current, a modulation current, and an error rate; transmitter parameters of the ONUs, such as a bias current, a modulation current, and an error rate; a CDR locking indication; FEC information produced from OLT and ONUs; external temperature measured in the vicinity of the OLT and ONUs; physical distance from the OLT to ONUs, and so on.

The failures that can be detected include, but are not limited to, end-of-life (EOL) of an ONU or OLT transmitter, a clock drift as a result of a malfunction of the ONU, the fiber channel, or the OLT, a broken fiber channel, high noise in the PON, an OLT with PLL problems, shot noises, and so on. An EOL can be detected by checking if a crossing distortion is present in an input signal and the average power is at allowable level. In order to detect a clock drift, the processor checks for each ONU if the average sampling point is changed from cell to cell. If the average sampling point is not fixed, a clock's failure may result either from an ONU or the OLT. The failure is determined to be in the OLT if the sampling points of all ONUs shows a common behavior. A damaged or stressed fiber is detected if an inter symbol interference (ISI) distortion present in a signal received from a specific ONU. In addition, problems in the optical fiber can be detected by correlating between the PON parameters an optical distance and a temperature as well as a phase drift as measured by the BCDR 200. Abnormal results indicate problems in the fiber. The processor can alert on high noise ratio in the PON if the number of detected narrow bits exceeds a predefined threshold. The shot noise phenomenon is detected by the BCDR 200 by recognizing a narrow-bit pattern in the input signal. For accurate diagnosis the processor may correlate the input from the BCDR 200 with other PON parameters, such as temperature, power supply problems, unexpected ONUs transmission, error rates, time of data, and so on.

The processor 280 can also detect signal-degradation and service deterioration before bit-errors are encountered by monitoring clock recovery problems of the ONU. Such problems can be indicated by jitter and cycle-to-cycle distortion (CCD). Furthermore, statistical information generated by the BCDR 200 can be used to estimate the quality of service (QoS) per customer. In addition, the generated statistic information can be used to calibrate the bias and modulation currents of an ONU, transmitter.

Figure 3:
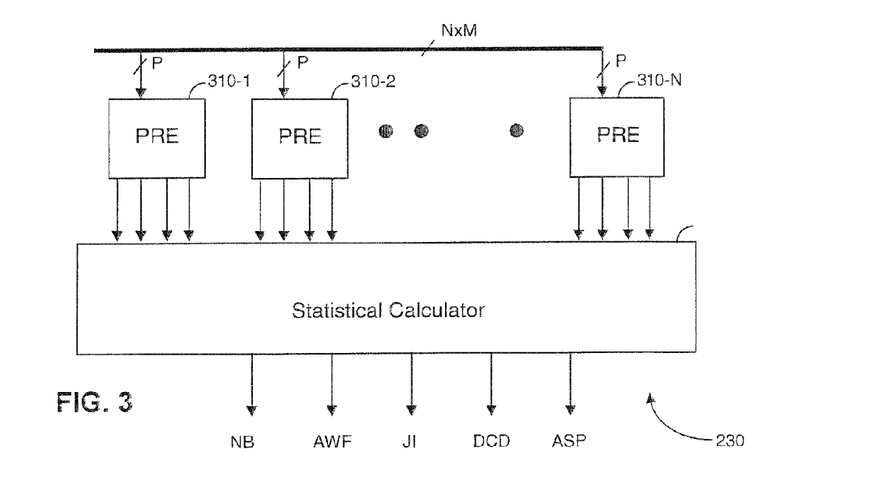
FIG. 3 is a diagram of a phase estimation unit utilized for measuring the quality of a burst signal in accordance with an embodiment of the present invention.

FIG. 3 shows a non-limiting block diagram of the PEU 230 for measuring the quality of a burst signal in accordance with an embodiment of the present invention. The PEU 230 includes a number of N pattern recognition blocks (PRBs) 310-1 through 310-N coupled to a statistical calculator 320. Each PRB 310 is designed to analyze a single input bit. The input of a PRB 310-$i$ includes a number, P, of input bits that are constructed from the over-sampled bits of input bits i, i–1, and i+1 as well as the last bit of the over-sampled bits for an input bit i–2. The input bits are part of the input signal 201. For example, if the over-sampler 220 is an over-sampler by four, the number of sampled bits is four and the number P is 1+4+4+4=13 bits. The PRB 310-1 receives inputs bits of a previous clock.

Each PRB 310 analyses its P input bits to identify patterns that indicate the quality of the received signals, and outputs at least four initial quality indicators. These indicators include a sampling point, a narrow bit indication, a number of consecutive '1' values in the input, and a valid bit indication. The statistical calculator 320 receives the outputs of each PRB 310 and computes an average sampling point (ASP), a number of detected narrow bits (NB), an average waveform (AWF), a jitter indication (JI), and a duty cycle distortion indication (DCD). Specifically, the ASP is the average sum of all sampling points produced by the PRBs 310. The NB measure is the sum of narrow bits reported by all PRBs 310. The AWF measures the average sum of the number of consecutive '1' values, as counted by the PRBs 310. The jitter indication (JI) is computed as follows:

$$JI = \sum_{i=1}^{N} (\text{Absolute}(ASP - SP_i)) \quad (1)$$

where, $SP_i$ is the sampling point produced by a PRB 310-$i$.

The duty cycle distortion indication is computed using the following equation:

$$DCD = \sum_{i=1}^{N} (\text{Absolute}(AWF - S1_i)) \quad (2)$$

where $S1_i$ is the number of consecutive '1' values counted by a PRB 310-$i$.

Figure 4A:
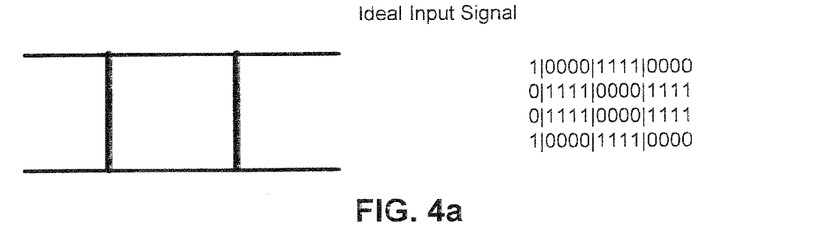
FIGS. 4a-4f are a series of graphs that demonstrate the relation between an eye pattern and a pattern recognition blocks input.
Figure 4B:
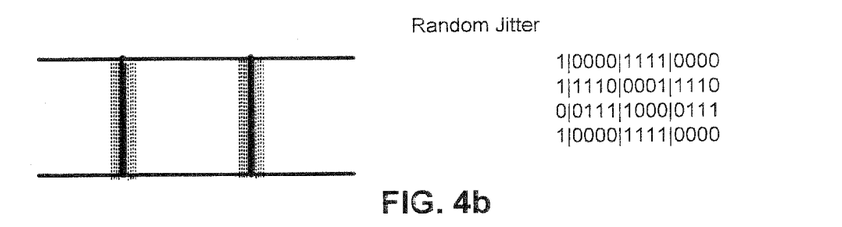
Figure 4C:
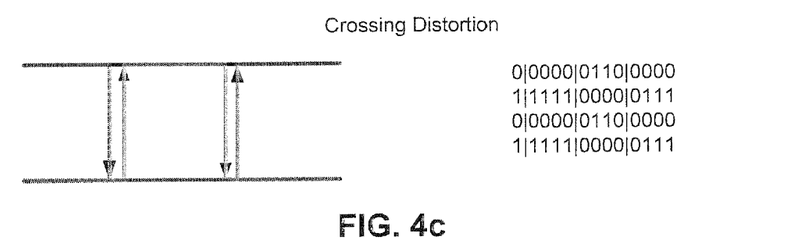
Figure 4D:
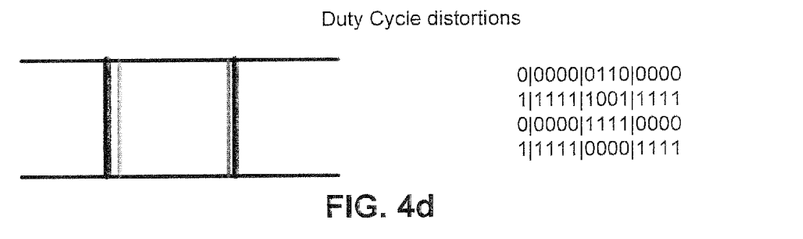
Figure 4E:
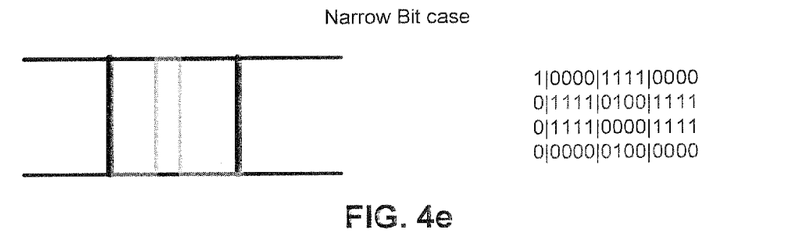
Figure 4F:
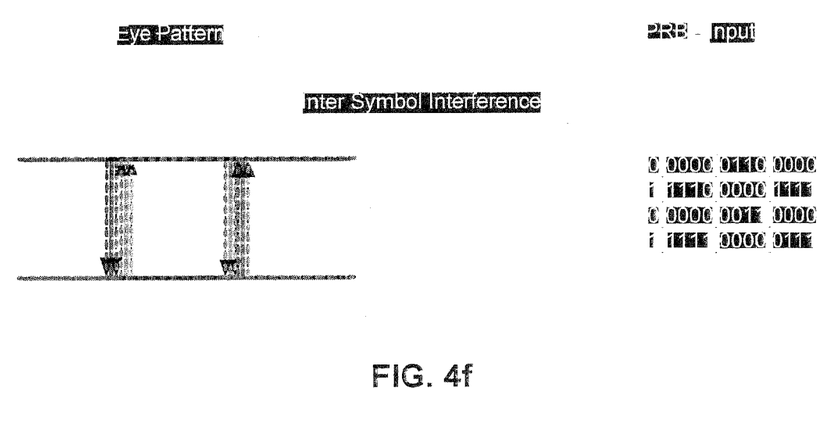

As mentioned above, the PRBs 310 are capable of identifying patterns in the input bits that may indicate distortions present in the received signal. FIG. 4 provides a series of illustrative graphs that demonstrate the relation between an eye pattern, measured at the input of the BCDR, and in the input of the PRBs 310 ("PRB input"). FIG. 4a shows an ideal eye pattern and its corresponding PRB input pattern. FIG. 4b is an eye pattern of a signal received with a random jitter and the corresponding PRB input pattern. FIG. 4c is a crossing distortion eye pattern of an input signal. The pattern of the PRB input shows that a length (i.e., number of bits) of the '1' value is shorter than the length of the '0' value. The crossing distortion may indicate an end-of-life of a laser or a failure in the OLT receiver. FIG. 4d shows an eye pattern of a signal having duty-cycle distortion. The pattern of the PRB input, in this case, shows that the number of bits of detected '1' and '0' values is not fixed. FIG. 4e represents a narrow bit case, where the PRB input includes a single bit for a detected '1' value. FIG. 4f shows an ISI eye pattern and its respective PRB input pattern. As can be noted the length of '0' and '0' values is greater than four bits, indicating an ISI distortion. In an alternative implementation, the statistical calculator 320 may be integrated in the SAB 250.

Figure 5:
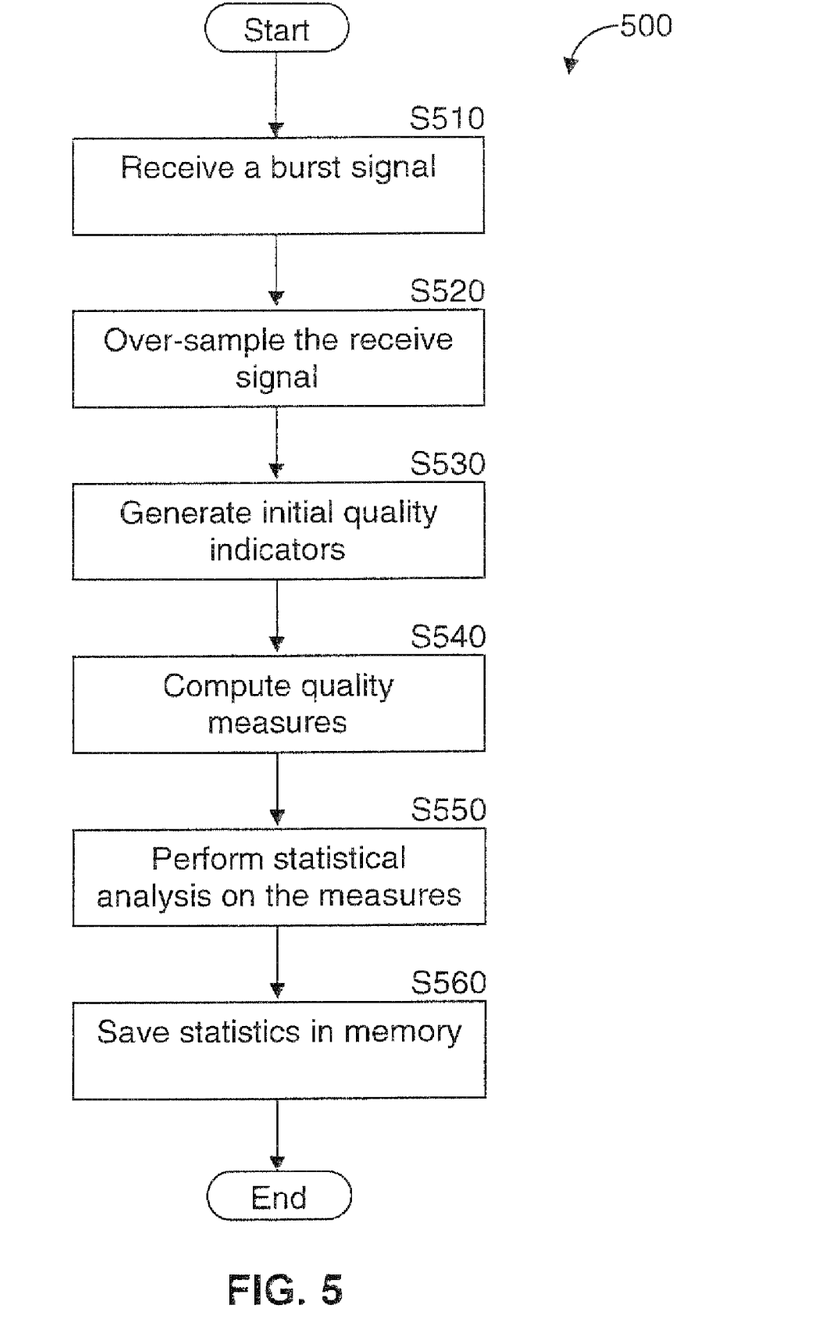
FIG. 5 is a flowchart describing a method for measuring the quality of a burst signal in accordance with an embodiment of the present invention.

FIG. 5 shows a flowchart 500 describing a method for measuring the quality of burst signals in accordance with a non-limiting embodiment of the present invention. At S510 a burst signal that includes N input bits is received. At S520 the N input bits are over-sampled by a factor M to generated a bit stream 204 that includes N×M bits. At S530 for each sequence of P bits (P<N×M) initial quality indicators are generated based on the pattern recognized in the P bits. The quality indicators include a sampling point, a narrow bit indication, a number of consecutive of '1' values in its input, and a valid bit indication. At S540 for all indicators generated for each sequence of P bits, the following quality measures are computed: an average sampling point (ASP), a number of detected narrow bits (NB), an average wave form (AWF), a jitter indication (JI), and a duty cycle distortion indication (DCD) as discussed in greater detail above. At S550 measures computed for each ONU are aggregated and statistical analysis is performed on the measures in different times within a cell. Specifically, for each of the ASP, NB, AWF, JI and DCD measures, the average, absolute, minimum, and maximum values during the beginning of the cell, the end of the cell and for the entire cell are computed. Thereafter, at S560 statistics computed at step S550 are saved in a memory per ONU ID, i.e., each ONU has its own gathered statistics. As mentioned above in greater detail a processor processes the information in the memory to perform line diagnostic to detect at least the root cause of failures and performance degradation. For this purpose, the processor may use other information collocated by other elements of the OLT.

The method described herein can be further integrated in hardware, software, firmware, middleware, or any combination thereof.

It will likewise be understood that the apparatus according to the invention may be realized at least partially a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. An apparatus for performing optical line diagnostics of a transmission line between optical network units (ONUs) and an optical line terminal (OLT) in a passive optical network (PON), the apparatus comprising:
    a phase error unit (PEU) for generating initial quality indicators and quality measures respective of input burst signals received at the OLT;
    a statistical accumulation block (SAB) coupled to the PEU and capable of performing statistical analysis on the quality measures by computing for each quality measure an average value, an absolute value, a minimum value, a swing value, and a maximum value, the SAB aggregates quality measures computed for each ONU in different times within a burst signal sent from the ONU, the quality measures include at least one of: an average sampling point (ASP), a number of detected narrow bits (NB), an average wave form (AWF), a jitter indication, and a duty cycle indication;
    a memory unit for storing statistics generated by the SAB; and
    a processor for processing statistics stored in the memory unit to generate a plurality of failure indications related to the optical line diagnostics.

2. The apparatus of claim 1, further comprising:
    an over-sampler capable of over-sampling input burst signals and being further capable of generating over-sampled bit streams;
    a phase interpolator capable of generating sampling clock signals using a reference clock and phase information; and
    a digital filter capable of selecting from the over-sampled bit streams a single data stream representing recovered data.

3. The apparatus of claim 2, wherein the PEU generates initial quality indicators by recognizing patterns in the over-sampled bit streams.

4. The apparatus of claim 3, wherein the initial quality indicators provide an indication about distortions present in the input burst signals and include at least one of: a sampling point, a narrow bit indication, a number of consecutive high logic values in the input bit stream, and a valid bit indication.

5. The apparatus of claim 1, wherein the statistics generated by the SAB are stored per ONU in the memory unit.

6. The apparatus of claim 5, wherein the processor further processes PON parameters to generate the plurality of failure indications.

7. The apparatus of claim 6, wherein the PON parameters comprise at least one of:
    a modulated signal amplitude indication (RSSI); a bias current, a modulation current, an error rate, a locking indication, forward error correction information; an external temperature, and a physical distance from the OLT to the ONUs.

8. The apparatus of claim 1, wherein the plurality of failure indications comprise at least one of: an end-of-life (EOL) of an ONU transmitter, an EOL of an OLT transmitter, a clock drift, a broken fiber channel, high noise in the PON, an OLT with unstable phase-lock-loop (PLL), and a shot noise.

9. The apparatus of claim 7, wherein the processor is further adapted to estimate the quality of service per customer coupled to an ONU by correlating PON parameters with statistics stored in the memory unit.

* * * * *